United States Patent
Hyun et al.

(10) Patent No.: US 8,130,248 B2
(45) Date of Patent: Mar. 6, 2012

(54) IMAGE FORMING APPARATUS AND LIGHT SCANNING APPARATUS

(75) Inventors: Ho-ill Hyun, Suwon-si (KR); Jae-yoon One, Yong-si (KR); Yoon-soo Chung, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1299 days.

(21) Appl. No.: 11/455,633

(22) Filed: Jun. 20, 2006

(65) Prior Publication Data

US 2007/0024929 A1 Feb. 1, 2007

(30) Foreign Application Priority Data

Jul. 26, 2005 (KR) .................. 10-2005-0067626

(51) Int. Cl.
*B41J 2/385* (2006.01)
(52) U.S. Cl. ...................... 347/134; 347/170
(58) Field of Classification Search .............. 347/170, 347/134
See application file for complete search history.

(56) References Cited

U.S. PATENT DOCUMENTS

| | | | | |
|---|---|---|---|---|
| 4,943,815 A | * | 7/1990 | Aldrich et al. | 347/256 |
| 2005/0057635 A1 | * | 3/2005 | Kubo | 347/130 |
| 2007/0076085 A1 | * | 4/2007 | Kim | 347/134 |

FOREIGN PATENT DOCUMENTS

| | | |
|---|---|---|
| JP | 60-171187 | 9/1985 |
| JP | 05-019603 | 1/1993 |
| JP | 07-244452 | 9/1995 |
| JP | 2003-177652 | 6/2003 |
| JP | 2003-295082 | 10/2003 |
| KR | 20-0162002 | 9/1999 |

OTHER PUBLICATIONS

Office Action issued in Korean Patent Application No. 2005-67626 on Aug. 30, 2006.
Abstract for Korean Publication No. 1999-0024341, Sep. 9, 1999.

* cited by examiner

*Primary Examiner* — Stephen Meier
*Assistant Examiner* — Sarah Al Hashimi
(74) *Attorney, Agent, or Firm* — Staas & Halsey LLP

(57) ABSTRACT

An image forming apparatus having a photosensitive element, is provided with a light source for scanning light to the photosensitive element; a light blocking member disposed in a light traveling path of the light from the light source and moving between a blocking position where the light blocking member blocks the light scanned from the light source and a withdrawal position where the light blocking member is withdrawn from the blocking position; a power supply unit for supplying electric power to the light source for scanning light; a power switch unit for regulating power supply from the power supply unit; and an operating part locating the light blocking member at the blocking position and controlling the power switch unit to cut off the power supply in a predetermined exposure condition. As a result, a user is kept from being exposed to the light from a light source.

12 Claims, 7 Drawing Sheets

IMAGE FORMING APPARATUS AND LIGHT SCANNING APPARATUS

CROSS-REFERENCE TO RELATED APPLICATIONS

This application claims all benefits accruing under 35 U.S.C. §119 from Korean Patent Application No. 2005-67626, filed on Jul. 26, 2005, in the Korean Intellectual Property Office, the disclosure of which is incorporated by reference herein.

BACKGROUND OF THE INVENTION

1. Field of the Invention

The present invention relates to an image forming apparatus, and more particularly, to an image forming apparatus which prevents a user from being exposed to a light from a light source.

2. Related Art

Generally, an image forming apparatus, such as a printer, a photo-copier, a facsimile machine and a multi-functional product, utilizes an electro-photographic method for image formation where an image is developed by applying developer to an electrostatic latent image formed on a photosensitive element by a potential difference and transferred to a printable medium such as paper to be formed, or an inkjet method for image formation where an image is formed by discharging ink onto a printable medium, through a multiplicity of inkjet nozzles, a dyes-sublimation method where an image is formed by selectively heating an ink ribbon contacting a printable medium and etc. Among these methods, the electro-photographic method is widely adopted to an image forming apparatus because of high printing speed, high resolution and low cost.

The image forming apparatus of the electro-photographic type comprises a paper feeding unit, a laser scanning unit (LSU), a developing unit, a fixing unit and a discharging unit. When the paper feeding unit supplies a printable medium such as paper, to the developing unit and the LSU scans a light source such as a laser, the developing unit selectively applies developer onto the printable medium to form a printed image. The fixing unit fixes the applied developer onto the printable medium by applying heat and pressure. The discharging unit then receives the printable medium with the developer being fixed from the developing unit and discharges the printable medium to the outside.

The developing unit is typically provided with a photosensitive element, a developing roller and a fixing roller. When the LSU scans laser onto the photosensitive element to form an electrostatic latent image, the developing roller develops an image by supplying developer to the latent image and the fixing roller transfers the developed image formed on the photosensitive element to a printable medium.

The LSU comprises a light source such as laser to scan light. A laser diode (LD) is typically used as a light source. In addition, a light emitting diode (LED) array in which a multiplicity of LED devices are disposed may also be used as a light source. If the light from the light source is exposed to the user, the light exposure may injure the user. Therefore, the light from such a light source needs to be effectively blocked to avoid exposure to the user, particularly, for example, when a cover of a main housing is opened.

FIG. 1 is a side sectional view of a typical image forming apparatus. As shown in FIG. 1, the image forming apparatus 1 comprises a main housing 30, a cover 40, a developing unit 11 and a light scanning unit (LSU) 20. The main body housing 30 accommodates the developing unit 11 and the light scanning unit (LSU) 20. The main body housing 30 accommodates a paper feeding unit (not shown) for storing a stack of printable media, such as paper, and supplying the printing paper to the developing unit 11, a fixing unit (not shown) for fixing developer applied to the printing paper, a discharging unit for discharging the printing paper having a fixed image and etc.

The cover 40 is coupled to the main housing 30, via a hinge 42, to rotate to open/close the main housing 30. The cover 40 is provided for the main housing 30 to be opened/closed so that the inside of the main housing 30 can be opened during, for example, installation or removal of the developing unit 11, malfunction or repair. The developing unit 11 comprises a photosensitive element 13 and is installed to and removed from the main housing 30.

The light scanning unit (LSU) 20 comprises a light source 21 such as laser for scanning light to the photosensitive element 13 and a frame 22 supporting the light source 21. A polygon mirror, a scanning lens, a reflecting mirror and other lenses are disposed along a light traveling path between the light source 21 and the photosensitive element 13. A light blocking unit 24 is rotatably coupled to the frame 22 by the light blocking hinge 25. In addition, the light blocking unit 24 is disposed on the light traveling path, and comprises a light slit 26 which the light goes through. The light slit 26 passes or blocks the light from the light source 21 according to the position of the light blocking unit 24.

The cover 40 comprises a protrusion 41 to contact the light blocking unit 24 when the main housing 30 is opened. When the cover 40 closes the main housing 30, the protrusion 41 presses the light blocking unit 24 in order for the light slit 26 to be located at a position so that the light slit 26 passes the light from the light source 21. Accordingly, the light source 21 may scan the light to the photosensitive element 13 to form an electrostatic latent image. When the cover 40 opens the main housing 30, the light blocking unit 24 is released from the pressure of the protrusion 41, so that the light slit 26 moves to a position where the light from the light source 21 is blocked. As a result, the user's exposure to the light from the light source 21 can be prevented by blocking the light scanned from the light source 21 when the cover 40 is opened. Such an example image forming apparatus 1 is described in more detail in Japan Patent Publication No. 06-297755.

However, according to the image forming apparatus 1, there still remains the possibility of the exposure of the light from the light source 21. If the light blocking position of the light blocking unit 24 deviates from a proper position because of deformation of the light blocking unit 24 due to heat, fatigue or etc. or the light blocking unit 24 does not completely blocks the light from the light source 21, the user may be exposed to the light from the light source 21. Particularly, the light source 21 is required to scan light having a high output in order to enhance the printing speed. Accordingly, it is much more important to stably and effectively block the light from the light source 21 in order to prevent the user from being exposed to the light having the high output.

SUMMARY OF THE INVENTION

Various aspects and example embodiments of the present invention provide an image forming apparatus which prevents a user from being exposed to the light from a light source.

Additional aspects and/or advantages of the present invention will be set forth in part in the description which follows and, in part, will be obvious from the description, or may be learned by practice of the present invention.

In accordance with an embodiment of the present invention, an image forming apparatus comprises a photosensitive element; a light source for scanning light to the photosensitive element; a light blocking member disposed in a light traveling path of the light from the light source and moving between a blocking position where the light blocking member blocks the light scanned from the light source and a withdrawal position where the light blocking member is withdrawn from the blocking position; a power supply unit for supplying electric power to the light source for scanning light; a power switch unit for regulating power supply from the power supply unit; and an operating part locating the light blocking member at the blocking position and controlling the power switch unit to cut off the power supply in a predetermined exposure condition.

According to an aspect of the present invention, the image forming apparatus further comprises a main housing and a developing unit having a photosensitive element and detachably mounted in the main housing, and the operating part locates the light blocking member at the withdrawal position, and controls the power switch unit to allow the power supply when the developing unit is mounted in the main housing, and locates the light blocking member at the blocking position and controls the power switch unit to cut off the power supply when the developing unit is detached from the main housing.

According to another aspect of the present invention, the developing unit comprises an actuating member which locates the light blocking member at the withdrawal position and actuates (e.g., presses) the operating part to move to a predetermined operating position in order for the power switch unit to allow the power supply when the developing unit is mounted in the main housing, and locates the light blocking member at the blocking position and releases the operating part to move to a predetermined safety position in order for the power switch unit to cut off the power supply when the developing unit is detached from the main housing.

According to another aspect of the present invention, a frame is provided for supporting the light source, and the operating part is hinged to the frame and rotated between the operating position and the safety position by the pressing member.

According to another aspect of the present invention, an elastic member is provided for actuating (pressing) the operating part to rotate from the operating position to the safety position.

According to another aspect of the present invention, a main housing having the photosensitive element is provided with a cover rotatably arranged to open/close the main housing, wherein the operating part locates the light blocking member at the withdrawal position and controls the power switch unit to allow the power supply when the cover rotates to close the main housing, and locates the light blocking member at the blocking position and controls the power switch unit to cut off the power supply when the cover rotates to open the main housing.

According to another aspect of the present invention, the cover comprises an actuating member which locates the light blocking part at the withdrawal position and actuates (e.g., presses) the operating part to move to a predetermined operating position in order for the power switch unit to allow the power supply when the cover rotates to close the main housing, and locates the light blocking member at the blocking position and releases the operating part to move to a predetermined safety position in order for the power switch unit to cut off the power supply when the cover rotates to open the main housing.

According to another aspect of the present invention, a frame is further provided for supporting the light source, and the operating part is hinged to the frame part and rotated between the operating position and the safety position by the operating part.

According to another aspect of the present invention, an elastic member is also provided for actuating (pressing) the operating part to rotate from the operating position to the safety position.

According to another aspect of the present invention, a frame is also provided for supporting the light source, and the light blocking member is hinged to the frame and rotated between the blocking position and the withdrawal position by the operating part.

According to another aspect of the present invention, the operating part extends from the light blocking member and rotates integrally with the light blocking member.

According to another aspect of the present invention, the power switch unit comprises a switching lever which is moved by the operating part between an ON position where the power supply from the power switch unit is permitted and an OFF position where the power supply from the power supply unit is cut off.

In accordance with another embodiment of the present invention, a light scanning apparatus comprises a light source for scanning light; a light blocking member disposed in a traveling path of the light from the light source and moving between a blocking position where the light blocking part blocks the light scanned from the light source and a withdrawal position where the light blocking member is withdrawn from the blocking position; a power supply unit for supplying electric power to the light source for scanning light; a power switch unit for regulating power supply from the power supply unit; and an operating part locating the light blocking member at the blocking position and controlling the power switch unit to cut off the power supply in a predetermined exposure condition.

In accordance with yet another embodiment of the present invention, an image forming apparatus comprises a light source to irradiating light for image formation; a light scanning unit (LSU) arranged to scan light irradiated from the light source onto a photosensitive element for image formation, wherein the light scanning unit (LSU) comprises a power supply unit to supply electric power to the light source for irradiating light; a power switch unit to regulate power supply from the power supply unit; a light blocking member disposed in a light traveling path of the light from the light source, and movable between a blocking position to block the light scanned from the light source and a withdrawal position to withdraw from the blocking position; and an operating member disposed to move the light blocking member between the blocking position and the withdrawal position, and to control the power switch unit to terminate the power supply in a predetermined exposure condition.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF EXAMPLE EMBODIMENTS

Figure 1:
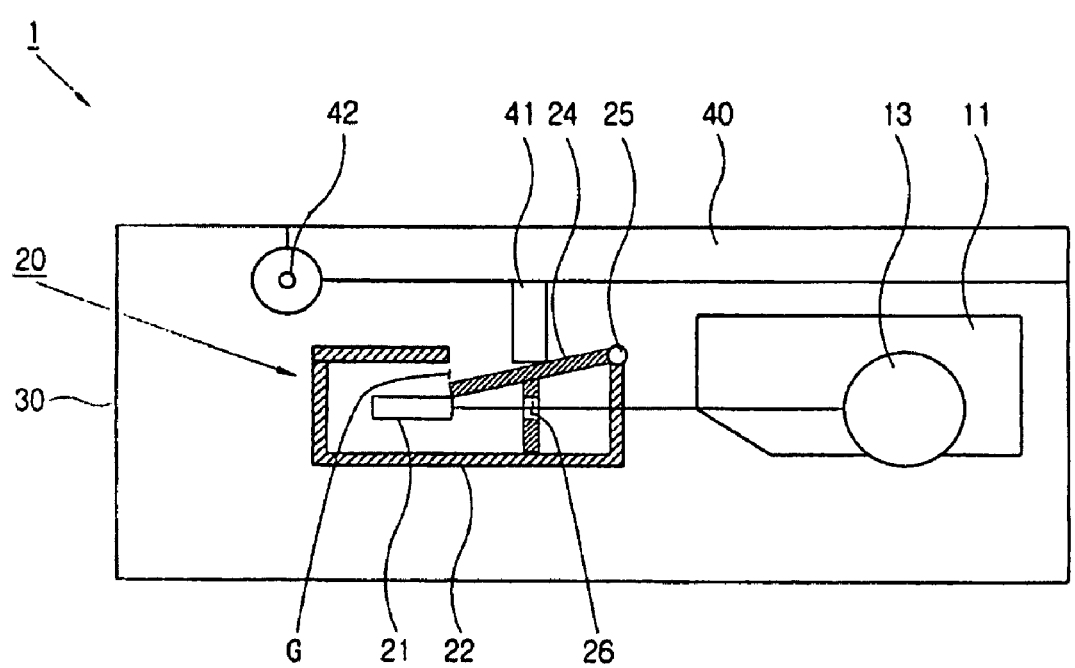
FIG. 1 is a side sectional view of a typical image forming apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
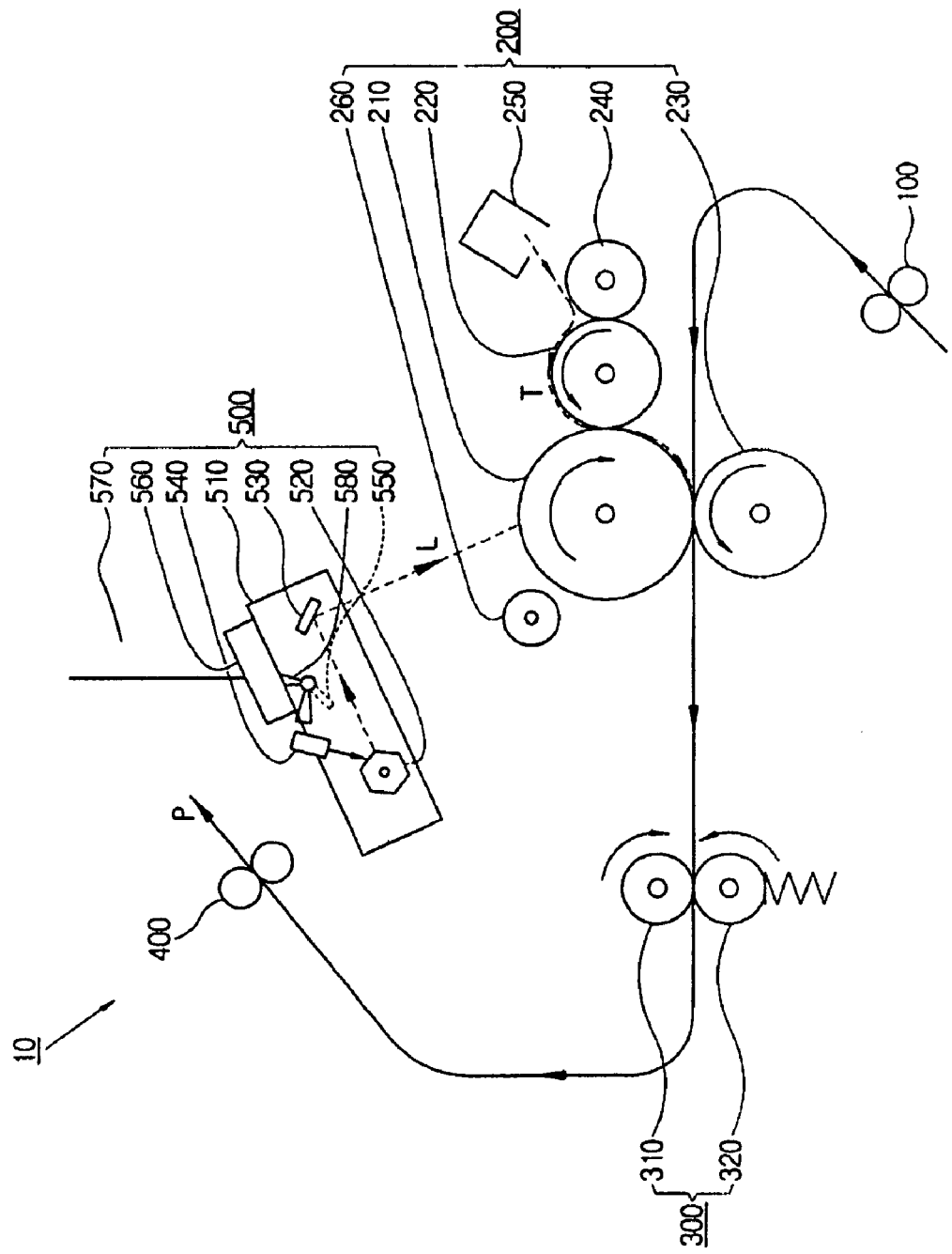
FIG. 2 is a side sectional view of an image forming apparatus according to an embodiment of the present invention.
Figure 3:
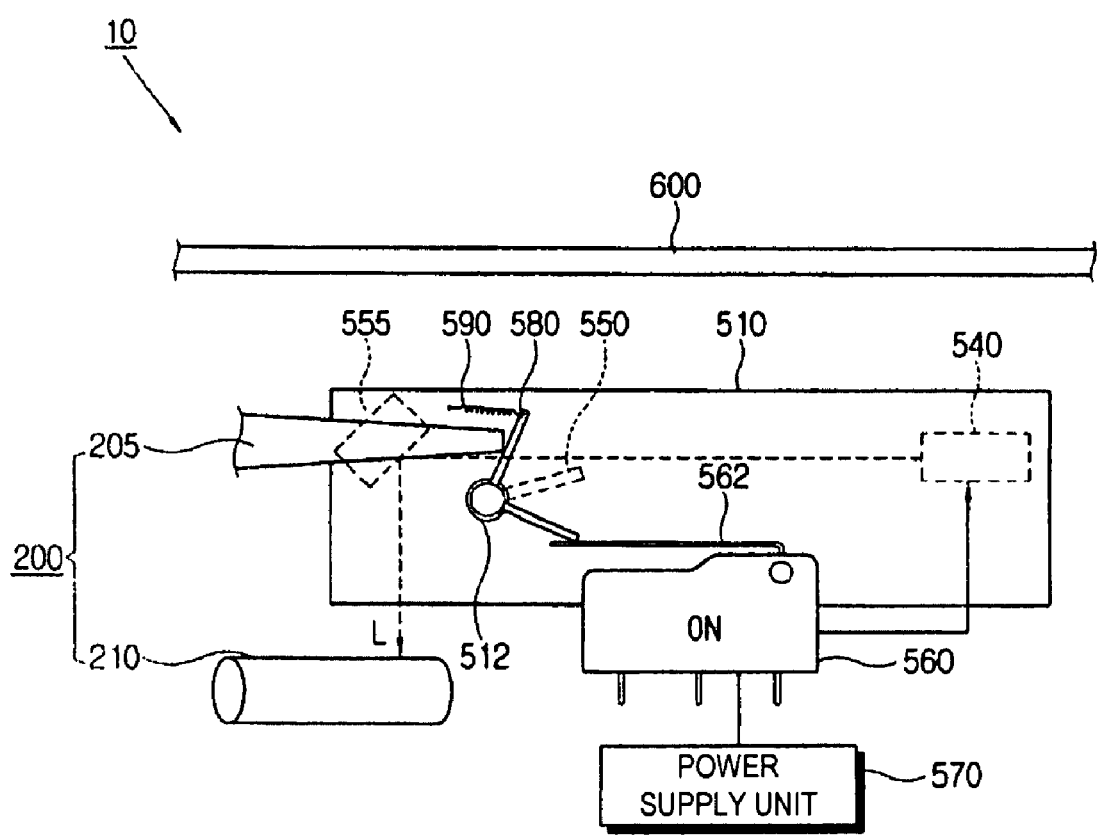
FIG. 3 is an enlarged view of an operating part of the image forming apparatus shown in FIG. 2, which is located at an operating position.
Figure 4:
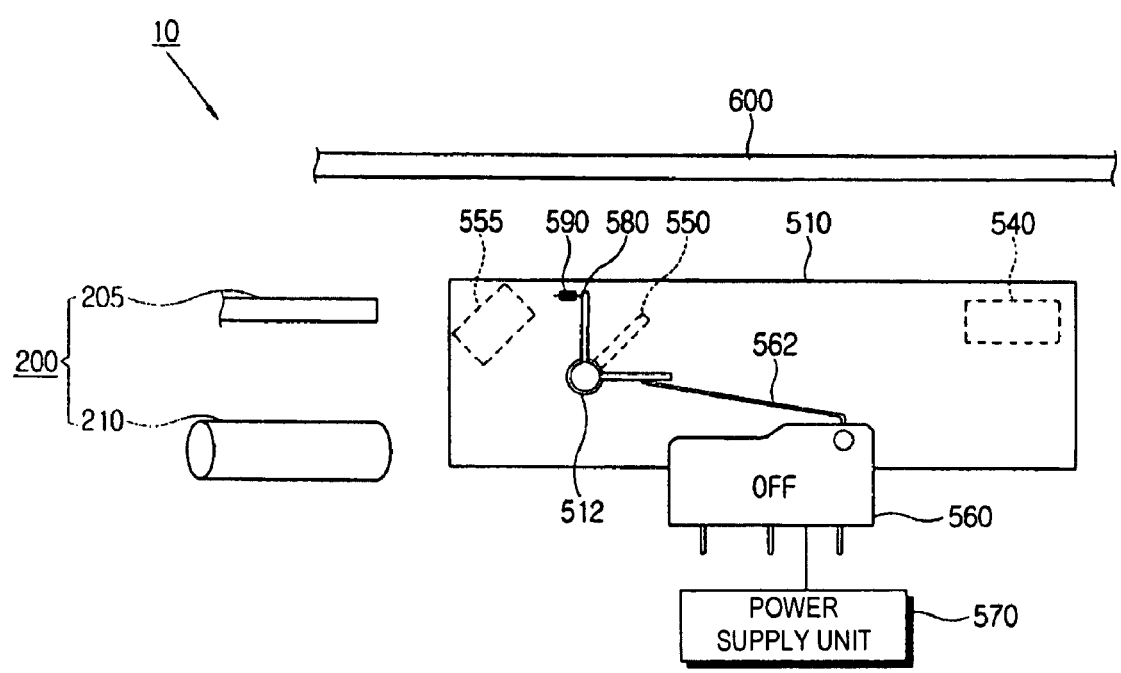
FIG. 4 is an enlarged view of an operating part of the image forming apparatus shown in FIG. 2, which is located at a safety position.

FIG. 2 is a side sectional view of an image forming apparatus according to an embodiment of the present invention. FIG. 3 shows an operating in FIG. 2, which is located at an operating position. FIG. 4 shows the operating part in FIG. 2, which is located at a safety position.

As shown in FIGS. 2 to 4, an image forming apparatus 10 comprises a paper feeding unit 100, a developing unit 200, a fixing unit 300 and a discharging unit 400. The paper feeding unit 100 supplies a printable medium such as a printing paper P to the developing unit 200. The developing unit 200 selectively applies developer, for example, toner, T to the printing paper P by a potential difference to form a desired image on the printing paper P. The fixing unit 300 fixes the developer T to the printing paper P. The discharging unit 400 receives the printing paper P having the desired image printed thereon from the fixing unit 300 and discharges the printing paper P to the outside.

The developing unit 200 comprises a photosensitive element 210, a developing roller 220, a transfer roller 230, a supply roller 240, a developer storage unit 250, and a charging roller 260. The photosensitive element 210 rotates and performs a predetermined developing process by passing through the charging roller 260, a light scanning unit (LSU) 500, the developing roller 220 and the transfer roller 230 in order. If the charging roller 260 charges the photosensitive element 210 to have a uniform surface voltage, the light scanning unit (LSU) 500 scans light L to the photosensitive element 210 to form an electrostatic latent image. The developer T on the surface of the developing roller 220 is selectively applied to the electrostatic latent image formed on the photosensitive element 210. The supply roller 240 receives the developer T from the developer saving unit 250 and supplies the developer T to the developing roller 220 so that the developing roller 220 can apply the developer T to the photosensitive element 210. The transfer roller 230 transfers the developer T on the photosensitive element 210 to the printing paper P which moves between the photosensitive element 210 and the transfer roller 230. The developing unit 200 may be detached from the main housing 600 because of exhaustion of the developer T or other various causes.

The fixing unit 300 comprises a heating roller 310 and a pressing roller 320 which are engaged with each other to fix an image on the printing paper P. The heating roller 310 comprises a heating member or heating means, and the pressing roller 320 comprises a pressing member or pressing means. If the fixing unit 300 receives the printing paper P which has the applied developer T, the heating roller 310 and the pressing roller 320 apply heat and pressure to the printing paper P respectively. Accordingly, the developer T is fused and pressed onto the printing paper P to form a printed image.

The light scanning unit (LSU) 500 comprises a frame 510, a polygon mirror 520, a reflecting mirror 530, a light source 540, a light blocking member 550 (e.g., a light shutter), a power switch unit 560, a power supply unit 570 and an operating part 580. The light scanned by the light scanning unit (LSU) 500 is reflected by the polygon mirror 520 and the reflecting mirror 530 to the photosensitive element 210 to form an image. The light source 540 may be provided with a plurality of lighting devices. For example, the light source 540 may comprise a laser diode, an LED (light emitting diode) device or other known lighting devices. The frame 510 supports the light source 540 and is supported by the main housing 600 to correspond to a mounting portion of the developing unit 200.

The light blocking member 550 (e.g., a light shutter) is disposed on a light traveling path of the light from the light source 540, and moves between a blocking position where the light blocking member 550 blocks the light scanned from the light source 540 and a withdrawal position where the light blocking member 550 is withdrawn from the blocking position. The light blocking member 550 is rotatably coupled to the frame 510, via a hinge 512. The light blocking member 550 rotates to move between the blocking position, as shown in FIG. 4, where the light blocking member 550 is disposed to intersect the light traveling path of the light from the light source 540, and the withdrawal position, as shown in FIG. 3, where the light blocking member 550 is spaced from the light traveling path in order not to interfere with the travel of the light. Alternatively, the light blocking member 550 may not only be coupled to the frame 510, via the hinge 512, but also be slidably mounted to the frame 510 or coupled to the frame 510 by other conventional coupling structures in order to block or pass the light from the light source 540. The light blocking member 550 may also comprise a light slit (not shown) which is disposed on the light traveling path to pass the light from the light source 540 when the light blocking member 550 is located at the withdrawal position and is moved aside from the light traveling path to block the light from the light source 540 when the light blocking member 550 is located at the blocking position.

The power supply unit 570 supplies electric power to the light source 540 for scanning light. The power switch unit 560 regulates power supply from the power supply unit 570. The power switch unit 560 is electrically interposed between the power supply unit 570 and the light source 540, and permits the power supply from the power supply unit 570 at an ON condition and cuts off the power supply from the power supply unit 570 at an OFF condition. Accordingly, the light source 540 may scan light when the power switch unit 560 is at the ON condition, and may not scan light when the power switch unit 560 is at the OFF condition.

The power switch unit 560 comprises a switching lever 562 which is moved by the operating part 580 between an ON position, as shown in FIG. 3, where the power supply from the power supply unit 570 is permitted and an OFF position, as shown in FIG. 4, where the power supply from the power supply unit 570 is cut off. Accordingly, the power switch unit 560 may be switched at the ON condition or at the OFF condition as the switching lever 562 is moved to the ON position or to the OFF position by the operation of the operating part 580. The switching lever 562 may comprise an end combined to the operating part 580 in order to move integrally with the operating part 580.

Instead of the switching lever 562, the power switch unit 560 may comprise other conventional means which contact with the operating part 580 and switch between the ON condition and the OFF condition.

The operating part 580 locates the light blocking member 550 at the blocking position, and controls the power switch unit 560 to cut off the power supply in a predetermined exposure condition. When the developing unit 200 is detached from the main housing 600, the cover 10 of the main housing 600 is opened, or the light from the light source 540 may be exposed to the user, the operating part 580 locates the light blocking member 550 at the blocking position to block the light, and converts the power switch unit 560 to the OFF condition, so that the operating part 580 blocks the power supply to the light source 540 for scanning light. Accordingly, the exposure of the light of the light source 540 to the user may be stably and effectively prevented.

The operating part 580 is hinged to the frame 510 and rotates between an operating position, as shown in FIG. 3, where the operating part 580 locates the light blocking member 550 to the withdrawal position and converts the power switch unit 560 to the ON condition and a safety position, as shown in FIG. 4, where the operating part 580 locates the light blocking member 550 to the blocking position and converts the power switch unit 560 to the OFF position. The operating part 580 may extend from the light blocking member 550 and rotate integrally with the light blocking member 550. The operating part 580 may be rotatably coupled to the frame 510, via the hinge 512. The operating part 580 may also be coupled to the frame 510 by a different hinge, or latch mechanism (not shown) instead of the hinge 512.

The elastic member 590 actuates (e.g., presses) the operating part 580 to rotate from an operating position to a safety position. When the developing unit 200 is detached from the main housing 600 and the operating part 580 is released from the pressure of the first pressing member 205, the elastic member 590 allows the operating part 580 to move from the operating position to the safety position. The elastic member 590 may comprise a coil spring, a plate spring or other conventional elastic members. The elastic member 590 may be interposed between the frame 510 and the operating part 580, or may be disposed to other suitable positions. Alternatively, the operating part 580 may comprise an elastic material to move elastically from the operating position to the safety position by its own elasticity without the elastic member 590. Alternatively, the operating part 580 may be configured to move from the operating position to the safety position by gravity. The elastic member 590 may actuate (press) the light blocking member 550 to move from the withdrawal position to the blocking position or actuate (press) the switching lever 562 to move from the ON position to the OFF position instead of pressing the operating part 580.

The operating part 580 locates the light blocking member 550 at the withdrawal position for the power switch unit 560 to permit power supplying when the developing unit 200 is mounted in the main housing 600, and locates the light blocking member 550 at the blocking position for the power unit 560 to cut off the power supply when the developing unit 200 is detached from the main housing 600. The developing unit 200 may comprise a first actuating member 205 to actuate (press) or release the operating part 580 when the developing unit 200 is attached to or detached from the main housing 600. The operating part 580 is provided outside of the frame 510 to be actuated (pressed) by the first actuating member 205 without interference.

As shown in FIG. 3, when the developing unit 200 is attached to the main housing 600, the first actuating member 205 actuates (e.g., presses) the operating part 580 to be located at the operating position. The operating part 580 actuates (presses) the light blocking member 550 to be located at the withdrawal position, and actuates (presses) the switching lever 562 to be located at the ON position. Accordingly, the power supply unit 570 may supply electric power to the light source 540 so that the light source 540 can scan light and the light L from the light source 540 may reach the photosensitive element 210 to form an electrostatic latent image without interference of the light blocking member 550.

As shown in FIG. 4, when the developing unit 200 is detached from the main housing 600, the first actuating member 205 releases the pressure applied to the operating part 580 to allow the operating part 580 to move back to the safety position. The operating part 580 rotates the light blocking member 550 to the blocking position, and locates the switching lever 562 to the OFF position. Accordingly, the light source 540 cannot scan light because it does not receive electric power from the power supply unit 570. Even if the light source 540 should scan light, the light cannot be exposed to the outside because it is blocked by the light blocking member 550.

The first actuating member 205 may be formed as a protrusion or any other shape if only it displaces the operating part 580 between the operating position and the safety position. This is done by moving according to the attachment or detachment of the developing part 200 to or from the main housing 600. The first actuating member 205 may comprise a switching device having a solenoid valve.

Figure 5:
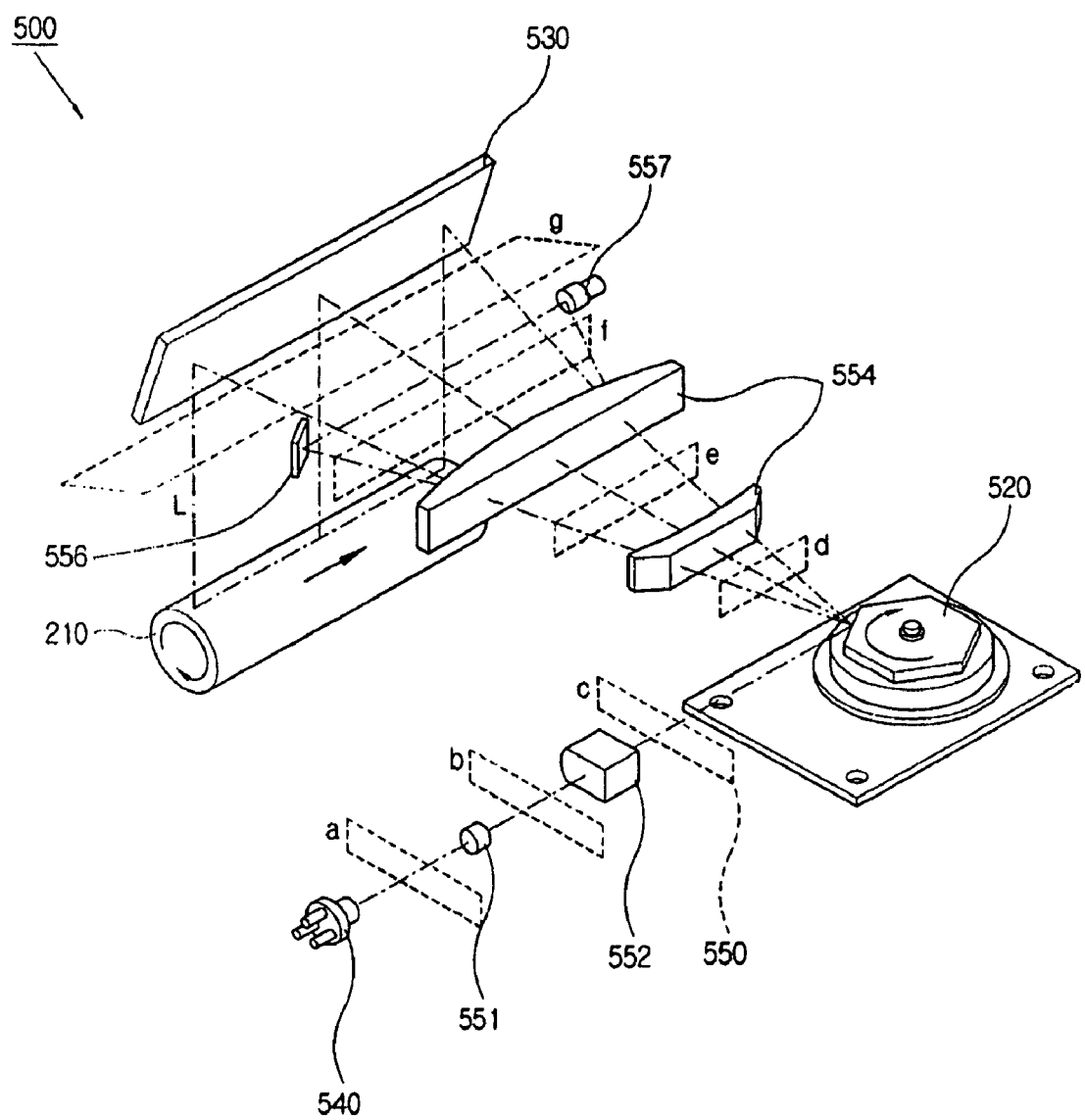
FIG. 5 is an exploded perspective view of light blocking positions of the light blocking member according to an embodiment of the present invention.

Hereinafter, the light blocking position of the light blocking member 550 will be described in detail with reference to FIG. 5. As shown in FIG. 5, the light scanning unit (LSU) 500 comprises a collimator lens 551, a cylindrical lens 552, the polygon mirror 520, a scan lens 554 and the reflecting mirror 530. In addition, a synchronous mirror 556 and a synchronous sensor 557 are disposed between the reflecting mirror 530 and the scan lens 554.

The collimator lens 551 adjusts the light L scanned by the light source 540 to be parallel with the axis of the light. The cylindrical lens 552 is interposed between the light source 540 and the polygon mirror 520, and adjusts the light L scanned by the light source 540 to converge into a sub scanning direction. The polygon mirror 520 rotates at a high speed, and reflects the light L from the light source 540 to spread towards the photosensitive element 210. The scan lens 554 adjusts the light L reflected by the polygon mirror 520 to converge into a main scanning direction. The reflecting mirror 530 reflects the light L passing through the scan lens 554 in a predetermined direction, so that an image is formed on the photosensitive element 210. A synchronous sensor 557 receives the light reflected by a synchronous mirror 556 and aligns the light synchronously scanned from the light source 540.

The light blocking member 550 may be disposed at one or more of the blocking positions "a" through "g" which are located between the light source 540 and the photosensitive element 210 to block the light L from the light source 540. The light blocking part 550 may be disposed in the light traveling path between the light source 540 and the polygon mirror 520 (that is, at one or more of the blocking positions "a" through "c") to block the light L from the light source 540. As the light L passing through the polygon mirror 520 spreads in the main scanning direction, the width of the light blocking member 550 at the downstream of the polygon mirror 520 (that is, at the blocking positions "d" through "g") need to be wide enough. However, the width of the light blocking member 550 at the upstream of the polygon mirror 520 (that is, at the blocking positions "a" through "c") may be less wide. Preferably, the light blocking member 550 may be disposed between the cylindrical lens 552 and the polygon mirror 520 (that is, at the blocking position "c"). The light blocking member 550 may be disposed between the polygon mirror 520 and the scan lens 554 or between the scan lens 554 and the reflecting mirror 530 to block the light L from the light source 540. It is convenient to dispose the light blocking unit 550 between the polygon mirror 520 and the scan lens 554, or between the scan lens 554 and the reflecting mirror 530 because of a sufficient space for the disposition.

Hereinafter, an image forming apparatus according to another embodiment of the present invention is described referring to FIGS. 6 and 7.

Figure 6:
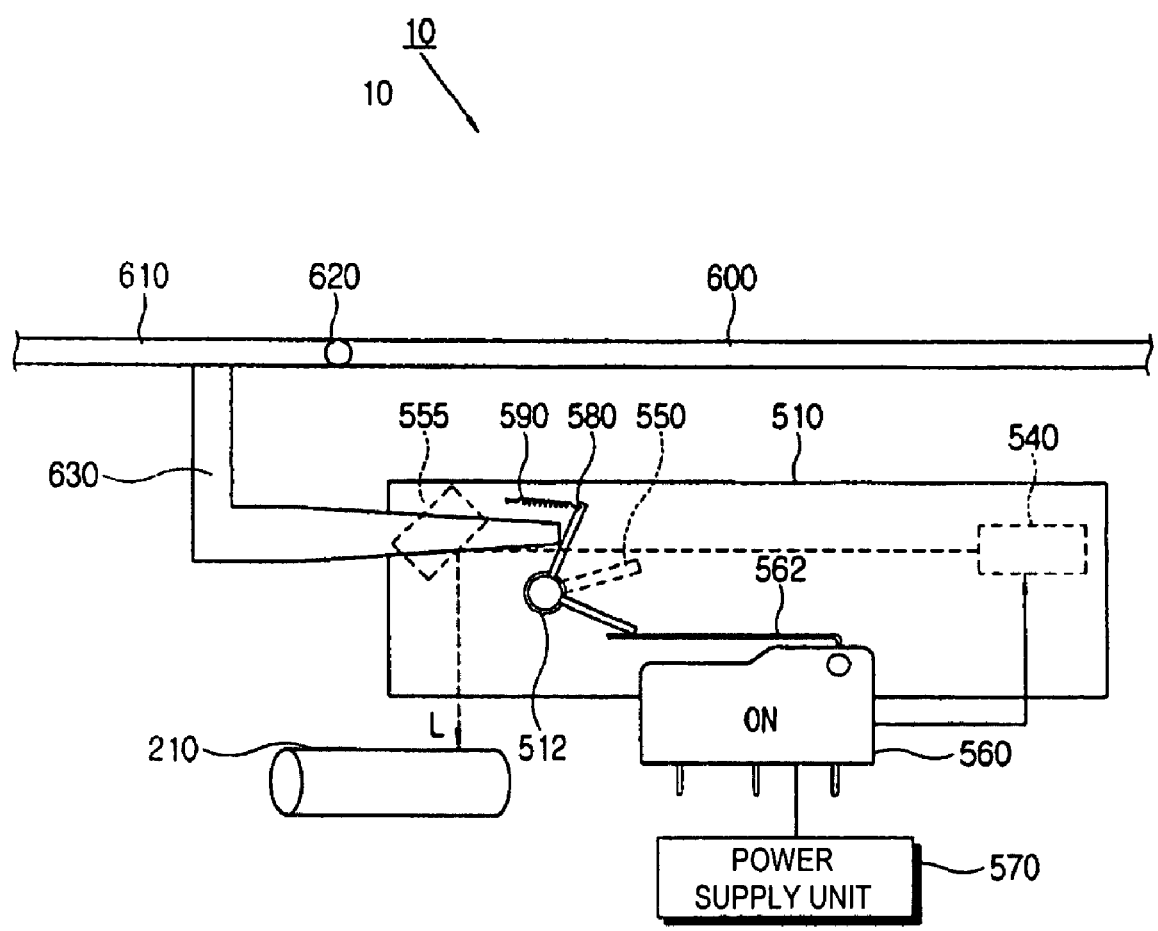
FIG. 6 is an enlarged side sectional view of an operating part of an image forming apparatus according to another embodiment of the present invention, which is located at an operating position.
Figure 7:
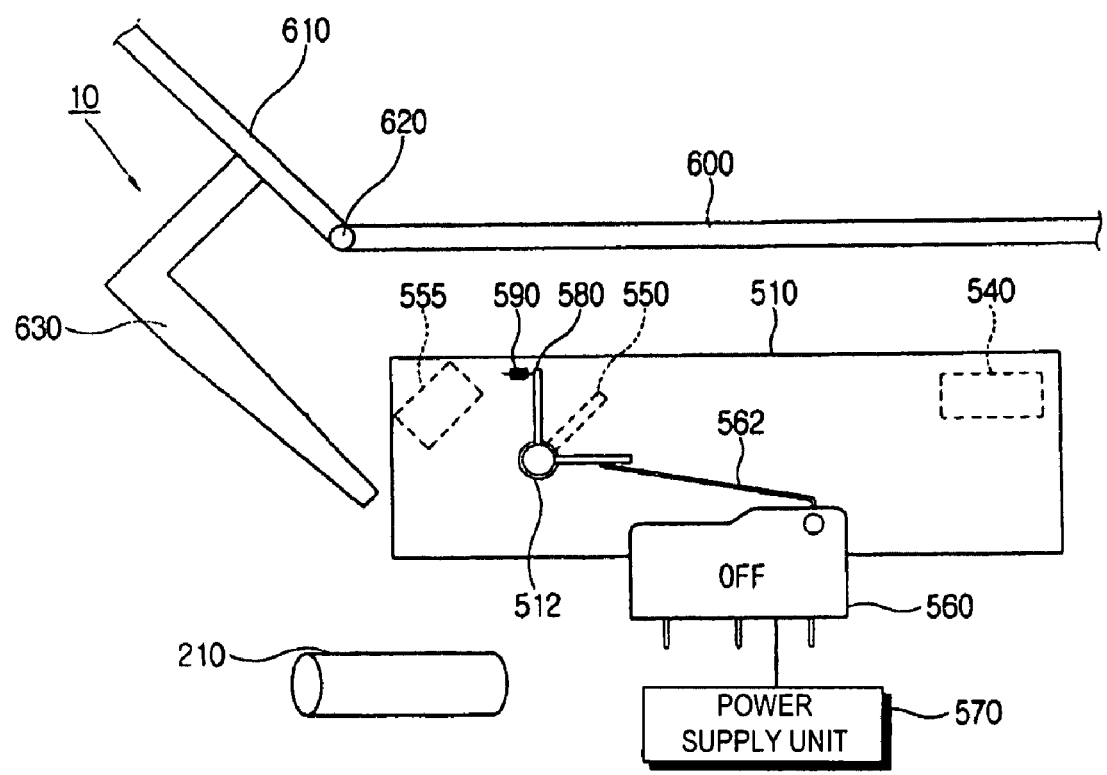
FIG. 7 is an enlarged view of an operating part of the image forming apparatus shown in FIG. 6, which is located at a safety position.

FIGS. 6 and 7 are enlarged side sectional views of an image forming apparatus according to another embodiment of the present invention. Specifically, FIG. 6 shows the operating part 580 at an operating position, and FIG. 7 shows the operating part 580 at a safety position.

As shown in FIGS. 6 and 7, the image forming apparatus 10 comprises a main housing 600 accommodating a photosensitive element 210 and a cover 610 for rotating to open/close the main housing 600. The cover 610 is coupled to the main housing 600, via a hinge 620.

When the cover 610 rotates to close the main housing 600, the operating part 580 locates the light blocking member 550 (e.g., a light shutter) at a withdrawal position in order for the power switch unit 560 to supply power to the power switch unit 560.

When the cover 610 rotates to open the main housing 600, the operating part 580 locates the light blocking member 550 (e.g., a light shutter) at a blocking position in order for the power switch unit 560 to cut off the power supply. The cover 610 comprises a second actuating member 630 for moving according as the cover 610 rotates to open or close the main housing 600 to actuate (press) or release the operating part 580.

When the cover 610 rotates to close the main housing 600, the second actuating member 630 actuates (presses) the operating part 580, so that the operating part 580 moves to an operating position, as shown in FIG. 6. When the cover 610 rotates to open the main housing 600, the second actuating member 630 releases the operating part 580, so that the operating part 580 moves to a safety position, as shown in FIG. 7.

Hereinafter, a light scanning unit (LSU) according to an embodiment of the present invention is described with reference to FIG. 3. As shown in FIG. 3, the light scanning unit (LSU) 500 according to an embodiment of the present invention comprises the light source 540, the light blocking member 550, the power supply unit 570, the power switch unit 560 and the operating part 580.

The light source 540 scans light. The light blocking member 550 is disposed in the light traveling path of the light from the light source 540 to move between a blocking position where the light blocking member 550 blocks the light from the light source 540 and the withdrawal position where the light blocking member 550 withdraws from the blocking position. The power supply unit 570 supplies electric power to the light source 540 for scanning the light. The power switch unit 560 regulates power supply of the power supply unit 570. In a predetermined exposure condition, the operating part 580 locates the light blocking member 550 at the blocking position and controls the power switch unit 560 to cut off the power supply.

As described above, the operating part of the image forming apparatus or the light scanning unit moves according to at least one of the rotation of the cover for opening/closing or attachment/detachment of the developing unit so that the operating part may regulate the light of the light source. The operating part may also move according to predetermined conditions when the user may be possibly exposed to the light from the light source, so that the operating part may regulate the light of the light source. As a result, the image forming apparatus and the light scanning unit (LSU) according to the present invention advantageously prevent the scanning light of the light source from being exposed to the outside, thereby preventing a user from being exposed to light of the light source more stably and effectively.

While the drive control device of the image forming apparatus of the present invention has been particularly shown and described with reference to exemplary embodiments thereof, it will be understood by those of ordinary skill in the art that various changes in form and details may be made therein without departing from the spirit and scope of the present invention. For example, components of a light scanning unit (LSU) can be arranged differently. In addition, other light sources can also be provided. Moreover, the operating part and the light blocking member can be constructed differently as long as light exposure to a user is prevented in the manner as described with reference to FIG. 2 to FIG. 7. Accordingly, it is intended, therefore, that the present invention not be limited to the various example embodiments disclosed, but that the present invention includes all embodiments falling within the scope of the appended claims.

What is claimed is:

1. An image forming apparatus having a photosensitive element, comprising:
   a light source for scanning light to the photosensitive element;
   a light blocking member disposed in a light traveling path of the light from the light source and moving between a blocking position to block the light scanned from the light source and a withdrawal position to withdraw from the blocking position;
   a power supply unit for supplying electric power to the light source for scanning light;
   a power switch unit for regulating power supply from the power supply unit;
   a single operating part for locating the light blocking member at the blocking position and controlling the power switch unit to cut off the power supply in a predetermined exposure condition;
   a main housing and a developing unit having the photosensitive element and detachably mounted in the main housing, the developing unit including an actuating member which positions the light blocking member at the withdrawal position for actuating the operating part to move to a predetermined operating position in order for the power switch unit to allow the power supply when the developing unit is mounted in the main housing, and positions the light blocking member at the blocking position and releases the operating part to move to a predetermined safety position in order for the power switch unit to cut off the power supply when the developing unit is detached from the main housing; and a frame to support the light source, the operating part being hinged to the frame and rotated between the operating position and the safety position by the actuating member.

2. The image forming apparatus according to claim 1, wherein the operating part positions the light blocking member at the withdrawal position and controls the power switch unit to allow the power supply when the developing unit is mounted in the main housing, and positions the light blocking member at the blocking position and controls the power switch unit to cut off the power supply when the developing unit is detached from the main housing.

3. The image forming apparatus according to claim 1, further comprising an elastic member to actuate the operating part to rotate from the operating position to the safety position.

4. The image forming apparatus according to claim 1, further comprising a cover to rotate to open/close the main housing, and
wherein the operating part locates the light blocking member at the withdrawal position and controls the power switch unit to allow the power supply when the cover rotates to close the main housing, and locates the light blocking member at the blocking position and controls the power switch unit to cut off the power supply when the cover rotates to open the main housing.

5. The image forming apparatus according to claim 4, wherein the cover comprises an actuating member which locates the light blocking member at the withdrawal position and actuates the operating part to move to a predetermined operating position in order for the power switch unit to allow the power supply when the cover rotates to close the main housing, and locates the light blocking member at the blocking position and releases the operating part to move to a predetermined safety position in order for the power switch unit to cut off the power supply when the cover rotates to open the main housing.

6. The image forming apparatus according to claim 1, wherein the operating part extends from the light blocking member and rotates integrally with the light blocking member.

7. The image forming apparatus according to claim 1, wherein the power switch unit comprises a switching lever which is moved by the operating part between an ON position where the power supply from the power supply unit is permitted and an OFF position where the power supply from the power supply unit is cut off.

8. A light scanning apparatus comprising:
a light source scanning light;
a light blocking member disposed in a traveling path of the light from the light source and moving between a blocking position where the light blocking member blocks the light scanned from the light source and a withdrawal position where the light blocking member is withdrawn from the blocking position;
a power supply unit for supplying electric power to the light source for scanning light;
a power switch unit for regulating power supply from the power supply unit; and
a single operating part locating the light blocking member at the blocking position and controlling the power switch unit to cut off the power supply in a predetermined exposure condition;
the light scanning apparatus being incorporated into an image forming apparatus having a main housing, and a developing unit having a photosensitive element and detachably mounted in the main housing, the developing unit comprises an actuating member for actuating the operating part to move to an operating position in order for the power switch unit to allow the power supply when the developing unit is mounted in the main housing, and for releasing the operating part to move to a safety position in order for the power switch unit to cut off the power supply when the developing unit is detached from the main housing; and
a frame to support the light source, the operating part being hinged to the frame and rotated between the operating position and the safety position by the actuating member.

9. The light scanning apparatus according to claim 8, wherein the operating part positions the light blocking member at the withdrawal position and controls the power switch unit to allow the power supply when the developing unit is mounted in the main housing, and positions the light blocking member at the blocking position and controls the power switch unit to cut off the power supply when the developing unit is detached from the main housing.

10. The light scanning apparatus according to claim 8, further comprising an elastic member to actuate the operating part to rotate from the operating position to the safety position.

11. The light scanning apparatus according to claim 8, further comprising a cover to rotate to open/close the main housing,
wherein the cover comprises an actuating member to actuate the operating part to move to an operating position in order for the power switch unit to allow the power supply when the cover rotates to close the main housing, and to release the operating part to move to a safety position in order for the power switch unit to cut off the power supply when the cover rotates to open the main housing.

12. The light scanning apparatus according to claim 11, wherein the power switch unit comprises a switching lever which is moved by the operating part between an ON position where the power supply from the power supply unit is permitted and an OFF position where the power supply from the power supply unit is cut off.

* * * * *

UNITED STATES PATENT AND TRADEMARK OFFICE
CERTIFICATE OF CORRECTION

PATENT NO. : 8,130,248 B2  
APPLICATION NO. : 11/455633  
DATED : March 6, 2012  
INVENTOR(S) : Ho-ill Hyun et al.

Page 1 of 1

It is certified that error appears in the above-identified patent and that said Letters Patent is hereby corrected as shown below:

Title page item [75], Line 2, Delete "Yong-si" and insert -- Yongin-si --, therefor.

Signed and Sealed this
Fourteenth Day of August, 2012

David J. Kappos
*Director of the United States Patent and Trademark Office*